US006769504B2

(12) United States Patent
Kobayashi et al.

(10) Patent No.: US 6,769,504 B2
(45) Date of Patent: Aug. 3, 2004

(54) ADAPTIVE CRUISE CONTROL SYSTEM FOR VEHICLE

(75) Inventors: Yosuke Kobayashi, Yokohama (JP); Hideaki Inoue, Yokohama (JP); Yoji Seto, Kanagawa (JP); Satoshi Tange, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 10/083,499

(22) Filed: Feb. 27, 2002

(65) Prior Publication Data

US 2002/0134602 A1 Sep. 26, 2002

(30) Foreign Application Priority Data

Mar. 26, 2001 (JP) ......................................... 2001-088065

(51) Int. Cl.[7] .............................................. B60K 31/04
(52) U.S. Cl. .......................... 180/169; 180/170; 701/79; 701/96
(58) Field of Search ................................ 180/169, 170, 180/179, 167, 178, 171; 701/96, 93, 79; 342/104, 109, 118

(56) References Cited

U.S. PATENT DOCUMENTS

| 5,529,139 | A | | 6/1996 | Kurahashi et al. | |
|---|---|---|---|---|---|
| 5,629,851 | A | * | 5/1997 | Williams et al. | 701/96 |
| 5,678,650 | A | | 10/1997 | Ishihara et al. | 180/169 |
| 5,839,534 | A | * | 11/1998 | Chakraborty et al. | 180/169 |
| 5,901,806 | A | * | 5/1999 | Takahashi | 180/170 |
| 5,999,874 | A | * | 12/1999 | Winner et al. | 701/93 |
| 6,009,368 | A | * | 12/1999 | Labuhn et al. | 701/96 |
| 6,044,321 | A | * | 3/2000 | Nakamura et al. | 701/96 |
| 6,154,168 | A | * | 11/2000 | Egawa et al. | 342/71 |
| 6,161,074 | A | * | 12/2000 | Sielagoski et al. | 701/96 |
| 6,223,117 | B1 | * | 4/2001 | Labuhn et al. | 701/93 |
| 6,311,123 | B1 | * | 10/2001 | Nakamura et al. | 701/96 |
| 6,339,740 | B1 | * | 1/2002 | Seto et al. | 701/96 |
| 6,370,470 | B1 | * | 4/2002 | Yamamura et al. | 701/96 |
| 6,430,494 | B1 | | 8/2002 | Inoue et al. | |
| 6,460,645 | B1 | * | 10/2002 | Asada et al. | 180/179 |
| 6,473,685 | B2 | * | 10/2002 | Kuroda et al. | 701/96 |
| 6,496,770 | B2 | * | 12/2002 | Winner et al. | 701/96 |
| 6,529,814 | B2 | * | 3/2003 | Ishizu et al. | 701/96 |
| 6,594,574 | B2 | * | 7/2003 | Isogai et al. | 701/96 |
| 6,658,344 | B2 | * | 12/2003 | Hirasago | 701/96 |

FOREIGN PATENT DOCUMENTS

| EP | 1 065 089 A2 | 1/2001 |
|---|---|---|
| JP | 4-321733 A | 11/1992 |
| JP | 6-255391 A | 9/1994 |
| JP | 6-320987 A | 11/1994 |
| JP | 7-76237 | 3/1995 |
| JP | 9-290665 A | 11/1997 |
| JP | 10-151964 A | 6/1998 |
| JP | 10-272964 A | 10/1998 |
| JP | 11-48827 A | 2/1999 |
| JP | 2001-10370 A | 1/2001 |

* cited by examiner

Primary Examiner—Brian L. Johnson
Assistant Examiner—Jeffrey J. Restifo
(74) Attorney, Agent, or Firm—Foley & Lardner LLP

(57) ABSTRACT

An adaptive cruise control system for a host vehicle includes a radar device for detecting a distance between the host vehicle and a preceding vehicle, a vehicle speed sensor for detecting a vehicle speed of the host vehicle and a controller for executing a host vehicle speed control based on the distance and the host vehicle speed. The controller cancels the host vehicle speed control when the radar device loses sight of the preceding vehicle.

14 Claims, 12 Drawing Sheets

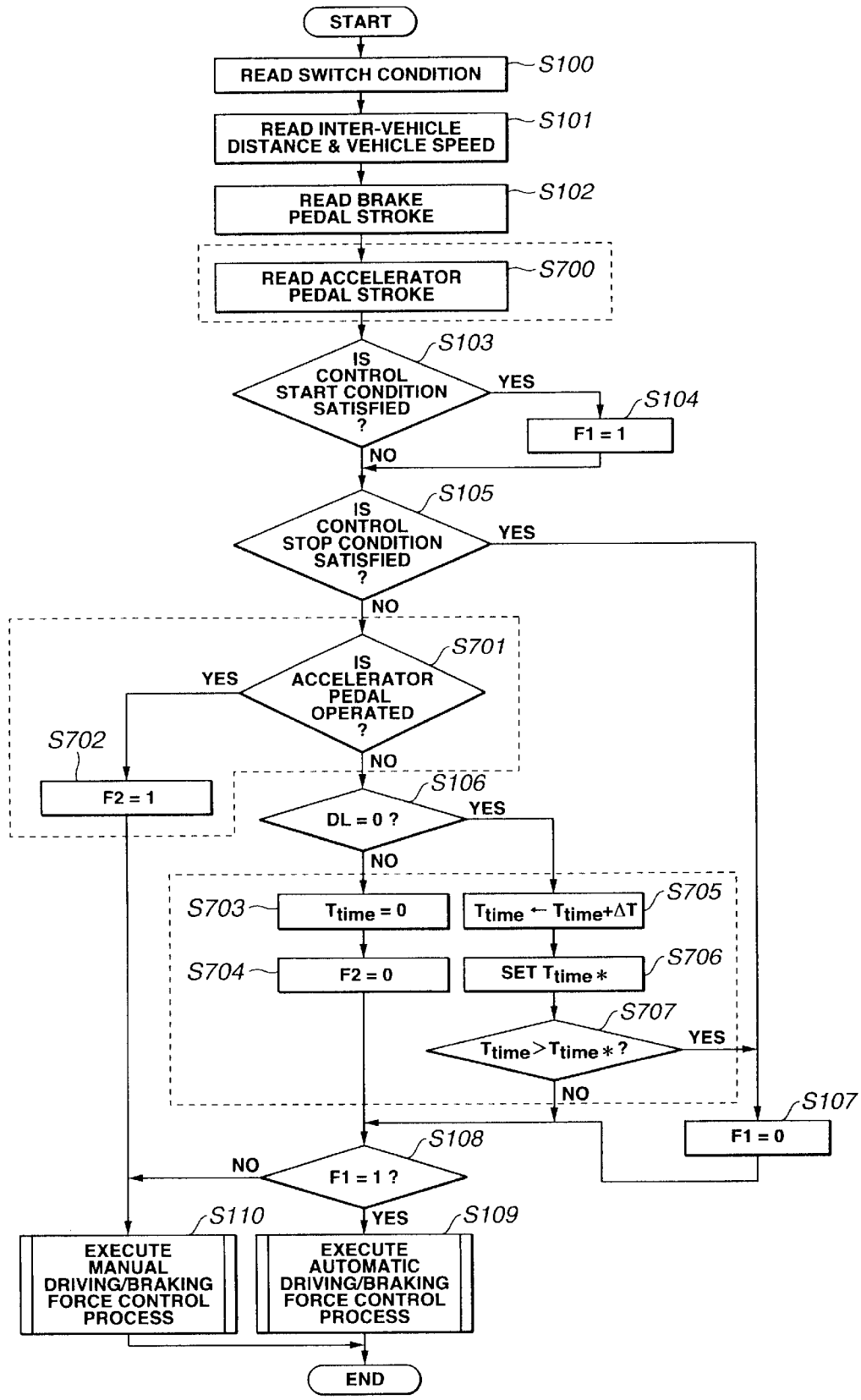

ADAPTIVE CRUISE CONTROL SYSTEM FOR VEHICLE

BACKGROUND OF THE INVENTION

The present invention relates to an adaptive cruise control system which executes a following control of a host vehicle relative to a preceding vehicle.

Japanese Patent Provisional Publication No. Heisei 7-76237 discloses a vehicle drive control system which estimates a vehicle speed of a preceding vehicle when an inter-vehicle distance detector loses sight of the preceding vehicle, in order to prevent a host vehicle from excessively approaching the preceding vehicle.

SUMMARY OF THE INVENTION

However, such a vehicle drive control system estimates the vehicle speed of the preceding :vehicle on the basis of the preceding vehicle speed at a moment before the inter-vehicle distance detector loses the sight of the preceding vehicle. Therefore, in some cases such that the preceding vehicle is decelerated just after the inter-vehicle distance detector loses the sight of the preceding vehicle, such an approach of the host vehicle to the preceding vehicle impresses the driver as strange feeling.

It is therefore an object of the present invention to provide an adaptive cruise control system which control a vehicle speed of a host vehicle so as to prevent a driver from having strange feeling.

An aspect of the present invention resides in an adaptive cruise control system which is for a host vehicle and which comprises a preceding vehicle detecting device, a vehicle speed detecting device and a controller. The preceding vehicle detecting device detects a preceding vehicle ahead of the host vehicle. The vehicle speed detecting device detects a host vehicle speed of the host vehicle. The controller is coupled to the preceding vehicle detecting device and the vehicle speed detecting device. The controller is arranged to execute a vehicle speed control of the host vehicle on the basis of detection results of the preceding vehicle detecting device and the vehicle speed detecting device, and to cancel the vehicle speed control when the preceding vehicle detecting device is incapable of detecting the preceding vehicle.

Another aspect of the present invention resides in a method of controlling an adaptive cruise of a host vehicle. The method comprises a step for detecting a preceding vehicle ahead of the host vehicle, a step for detecting a host vehicle speed of the host vehicle, a step for executing a vehicle speed control for controlling the host vehicle speed on the basis of a detected state of the preceding vehicle and the detected host vehicle speed, and a step for canceling the vehicle speed control when the preceding vehicle detecting means is incapable of detecting the preceding vehicle.

The other objects and features of this invention will become understood from the following description with reference to the accompanying drawings.

BRIEF DESCRIPTION OF THE DRAWINGS

FIG. 12 is a flowchart showing the vehicle speed control process executed by the vehicle speed controller of a fifth embodiment.

DETAILED DESCRIPTION OF THE INVENTION

Referring to FIGS. 1 to 6, there is shown a first embodiment of an adaptive cruise control system according to the present invention.

Figure 1:
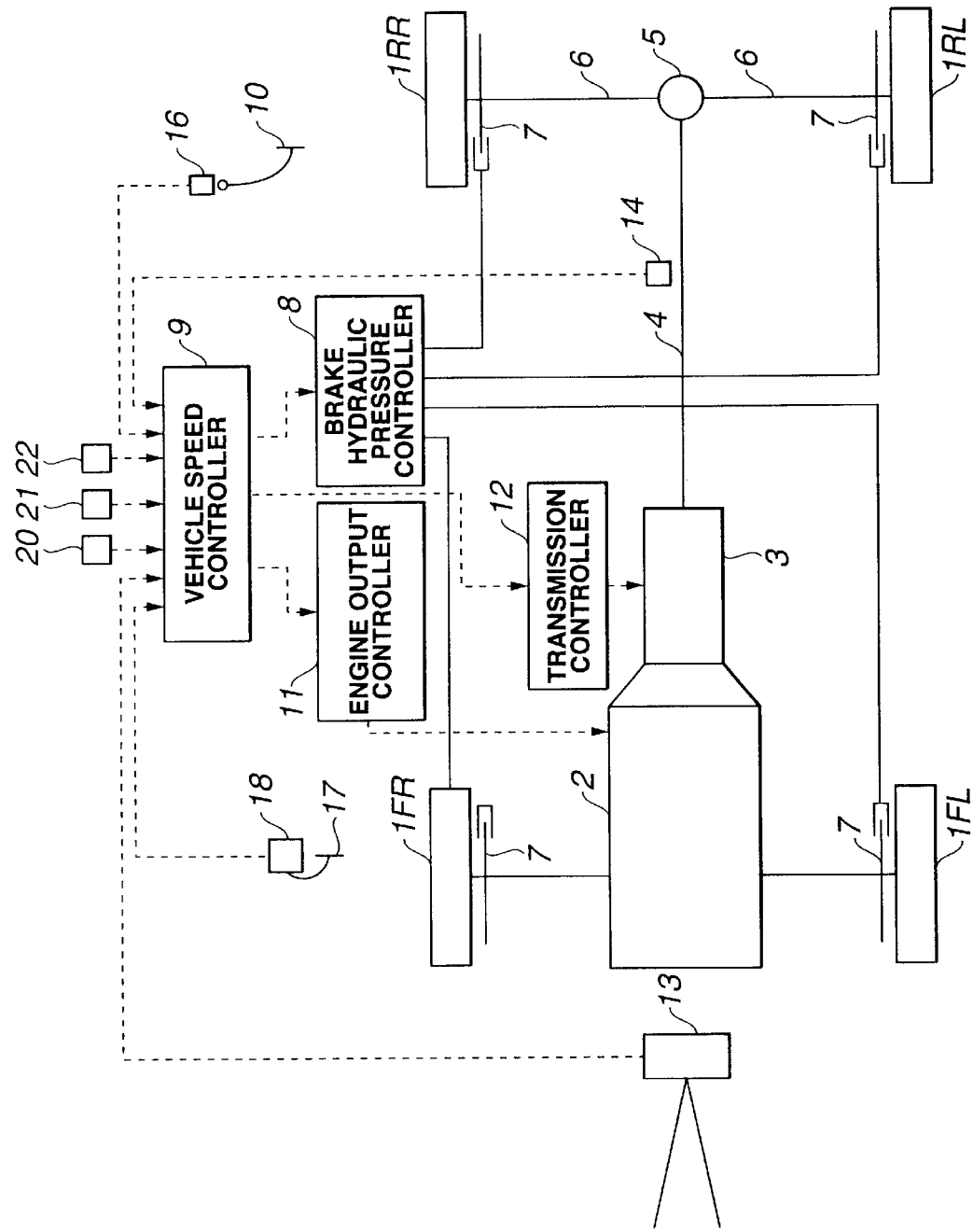
FIG. 1 is a schematic diagram showing a vehicle equipped with an adaptive cruise control system of the first embodiment according to the present invention.

As shown in FIG. 1, the vehicle equipped with the adaptive cruise control system has a pair of front wheels 1FL and 1FR acting as driven (following) wheels and a pair of rear wheels 1RL and 1RR acting as driving wheels. Rear wheels 1RL and 1RR are driven by driving force which is generated by an internal combustion engine 2 and which is transmitted to rear wheels 1RL and 1RR through an automatic transmission 3, a propeller shaft 4, a final reduction gear 5 and an axle 6.

A disc brake 7 is provided on each of front and rear wheels 1FL, 1FR, 1RL and 1RR. A brake hydraulic pressure controller 8 controls brake hydraulic pressure applied to each disc brake 7. Brake hydraulic pressure controller 8 is arranged to generate the brake hydraulic pressure according to a target brake pressure $B_*$ calculated by a vehicle speed controller 9 as a command value. During a normal state, vehicle speed controller 9 calculates target brake pressure $B_*$ according to a depression quantity of a brake pedal 10. Further, when an automatic driving/braking force-control is being executed, vehicle speed controller 9 calculates target brake pressure $B_*$ according to logic for controlling a host vehicle speed $V_{car}$ so that the host vehicle follows a preceding vehicle.

An engine output controller 11 is installed in engine 2 and controls an output of engine 2. Engine output controller 11 controls the output torque of engine 2 by controlling an opening of a throttle valve and a fuel injection quantity of engine 2. Engine output controller 11 controls the engine output according to a command engine torque sent from vehicle speed controller 9.

Automatic transmission 3 is coupled to a transmission controller 12 which controls a shift position of automatic transmission 3 and a working fluid pressure corresponding to the selected shift position. Transmission controller 12 is coupled to vehicle speed controller 9 and controls the shift position and the working fluid pressure according to a shift command sent from vehicle speed controller 9.

Vehicle speed controller 9 calculates the command engine torque and the shift command according to a depression quantity of an accelerator pedal 17 during the normal control state. Further, when the automatic driving/braking force control is being executed, vehicle speed controller 9 calculates the command engine torque and the shift command according to the logic for controlling host vehicle speed $V_{car}$ so that the host vehicle follows the preceding vehicle.

A radar device 13 for detecting an inter-vehicle distance DL between the preceding vehicle and the host vehicle is-installed at a front portion of the host vehicle. Radar device 13 is a laser radar which scans laser beams and receives a reflection beam reflected from a preceding vehicle to measure inter-vehicle distance DL. When radar device 13 cannot detect a preceding vehicle, that is, when radar device 13 loses sight of a preceding vehicle, radar device 13 outputs a signal indicative of "0" as an inter-vehicle distance DL. A vehicle speed sensor 14 is installed at propeller shaft 4 and detects host vehicle speed $V_{car}$ on the basis of the rotation speed of propeller shaft 4.

A brake pedal stroke sensor 16 is installed at brake pedal 10 and detects a stroke (a depression quantity or a controlled quantity) from a depressed position of brake pedal 10. An accelerator pedal stroke sensor 18 is installed at accelerator pedal 17 and detects a stroke from a depressed position of accelerator pedal 17.

Figure 2:
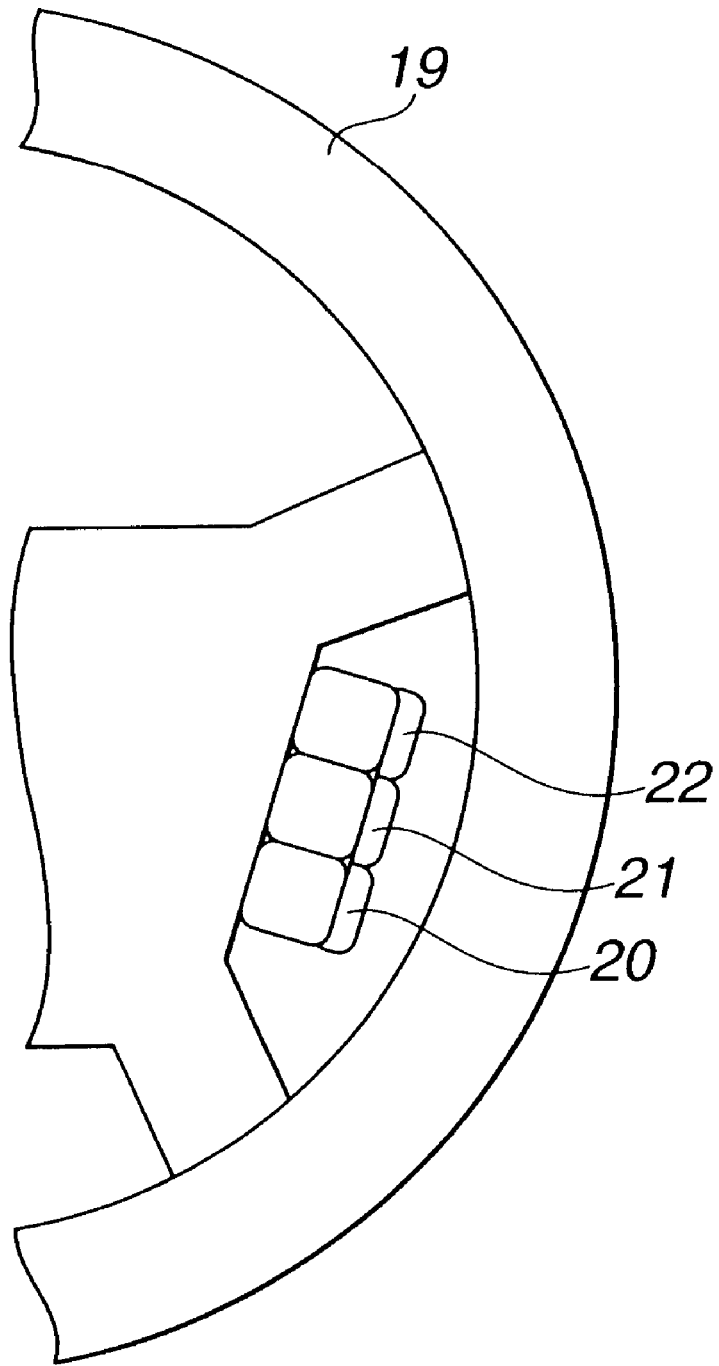
FIG. 2 is a schematic view showing a steering wheel equipped with a switch unit of the adaptive cruise control system of the first embodiment.

As shown in FIG. 2, a set switch 20, a cancel switch 21 and a main switch 22 are installed at a steering wheel 19. When a driver intends to execute a vehicle speed control, the driver operates set switch 20. When the driver intends to cancel the operation of set switch 20, the driver operates cancel switch 21. The driver operates main switch 22 prior to set switch 20 in order to put set switch 20 in an operable state.

When the host vehicle travels at a vehicle speed within a predetermined speed range, such as a range from a lower limit VL to an upper limit VH and when both of main switch 22 and set switch 20 are turned on, vehicle speed controller 9 starts to control the driving/braking force so that the host vehicle follows the preceding vehicle if vehicle speed controller 9 detects the preceding vehicle.

Figure 3:
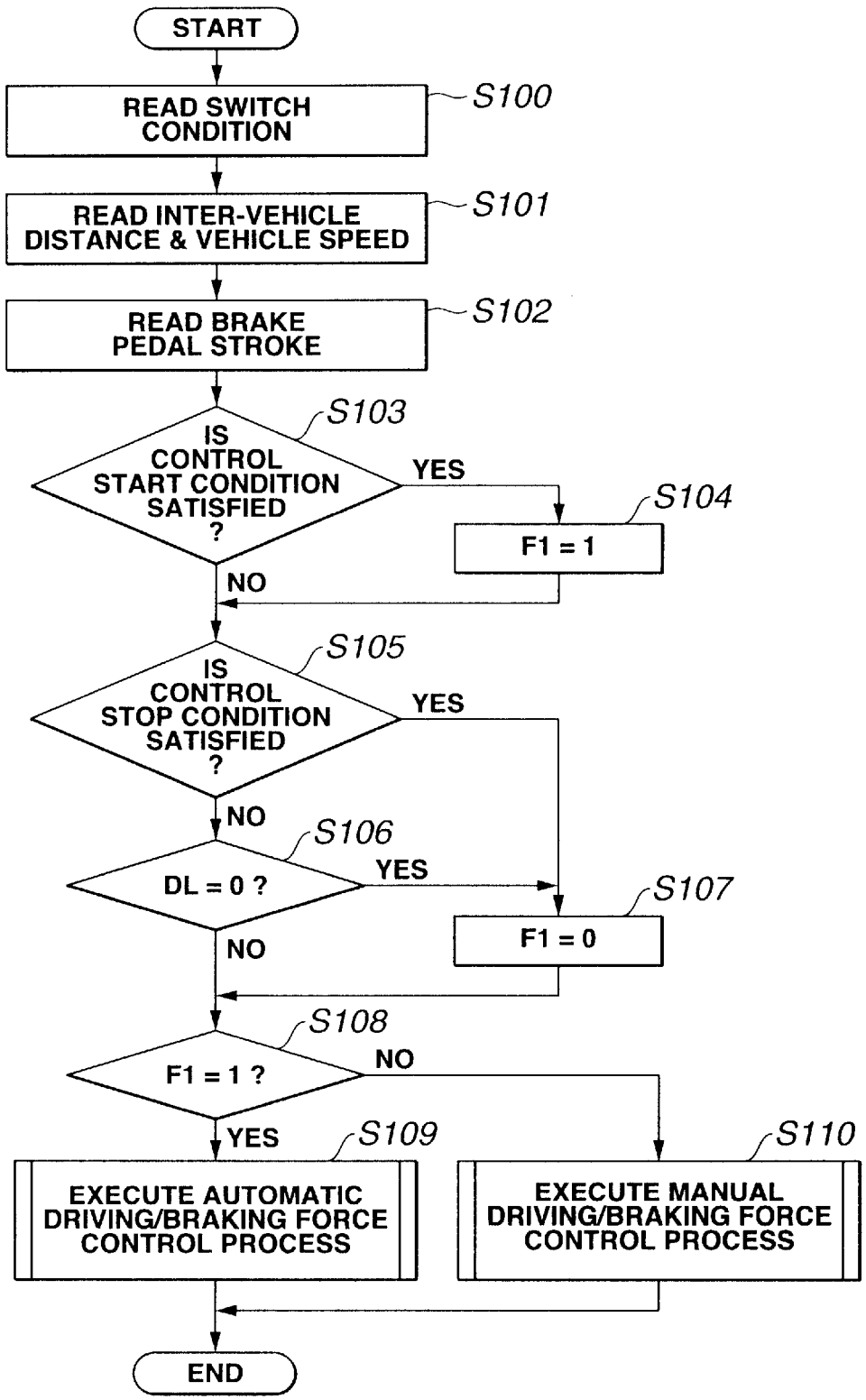
FIG. 3 is a flowchart showing a speed control process executed by a vehicle speed controller of the first embodiment.

Vehicle speed controller 9 is provided with a microcomputer for executing the above-described controls and a peripheral equipment thereof. The microcomputer of vehicle speed controller 9 executes a calculation process of the vehicle speed at predetermined intervals $\Delta T$ such as 10 msec., as shown in FIG. 3. That is, the vehicle speed control calculation process is executes as a timer interruption process every predetermined interval $\Delta T$ as follows:

At step S100, vehicle speed controller 9 reads information as to whether set switch 20, cancel switch 21 and main switch 22 are turned on or not.

At step S101, controller 9 reads inter-vehicle distance DL from radar device 13 and host vehicle speed $V_{car}$ from vehicle speed sensor 14.

At step S102, controller 9 reads information as to whether or not brake pedal 10 is operated on the basis of the signal from brake pedal stroke sensor 16.

At step S103, controller 9 determines whether a control start condition for executing the vehicle speed control of host vehicle speed $V_{car}$ is satisfied or not. That is, controller 9 determines whether host vehicle speed $V_{car}$ is in the predetermined speed range ranging from lower limit VL to upper limit VH when both of main switch 22 and set switch 20 are turned on. When the determination at step S103 is affirmative, that is, when both of main switch 22 and set switch 20 are turned on and when host vehicle speed $V_{car}$ is in the predetermined range (VL$\leq V_{car} \leq$VH), the routine proceeds to step S104. When the determination at step S103 is negative, the routine proceeds to step S105.

At step S104 subsequent to the affirmative determination at step S103, controller 9 sets a control flag F1 indicative that the vehicle speed control of host vehicle speed $V_{car}$ is executed, at "1" (F1=1). Then the routine proceeds to step S105.

At step S105 subsequent to the negative determination at step S103 or the execution of step S104, controller 9 determines whether a control stop condition for canceling the vehicle speed control is satisfied or not. More specifically, controller 9 determines whether or not cancel switch 21 is turned on, whether or not host vehicle speed $V_{car}$ is out of the predetermined speed range from VL to VH or whether or not brake pedal 10 is depressed. When the determination at step S105 is affirmative, that is, when cancel switch 21 is turned on, when host vehicle speed $V_{car}$ is out of the predetermined speed range from VL to VH or when brake pedal 10 is depressed, the routine proceeds to step S107. When the determination at step S105 is negative, the routine proceeds to step S106.

At step S106, controller 9 determines whether radar device 13 cannot detect a preceding vehicle (loses sight of a preceding vehicle). More specifically, controller 9 determines whether the signal indicative of inter-vehicle distance DL is "0" or not. When the determination at step S106 is affirmative, the routine proceeds to step S107. When the determination at step S106 is negative, the routine proceeds to step S108.

At step S107, controller 9 resets control flag F1 at "0" (F1=0). Then the routine proceeds to step S108.

At step S108, controller 9 determines whether control flag F1 is set at "1" or not. When the determination at step S108 is affirmative (F1=1), the routine proceeds to step S109. When the determination at step S108 is negative, the routine proceeds to step S110.

At step S109, controller 9 executes the automatic driving/braking force control process. Then the routine proceeds to an end block to terminate the present routine. The automatic driving/braking force control process will be discussed later with reference to FIG. 4.

At step S110, controller 9 executes a manual driving/braking force control process. Then, the routine proceeds to the end block. The manual driving/braking force control process will be discussed later with reference to FIG. 6.

Next, there will be discussed the automatic driving/braking force control process executed at step S109 in the flowchart of FIG. 3, with reference to a flowchart of FIG. 4.

At step S200, vehicle speed controller 9 calculates a target inter-vehicle distance DL*. Target inter-vehicle distance DL* has a characteristic that is determined according to host vehicle speed $V_{car}$ as shown by a graph of FIG. 5.

Figure 5:
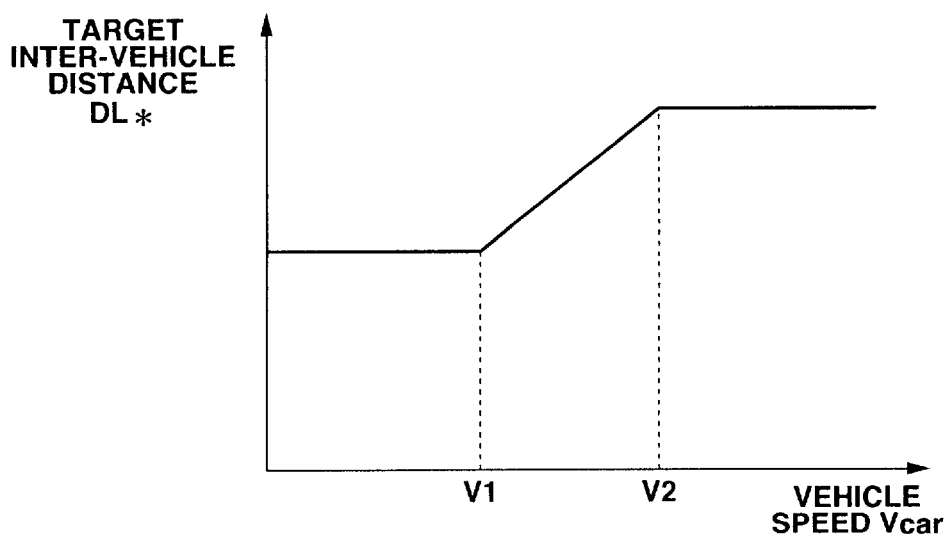
FIG. 5 is a control map employed in the calculation process of FIG. 4.

A relationship between host vehicle speed $V_{car}$ and target inter-vehicle distance DL* will be discussed with reference to FIG. 5. When the host vehicle travels at low speed ($0 < V_{car} \leq V1$), target inter-vehicle distance $DL_*$ is set at a first constant value regardless the magnitude of host vehicle speed $V_{car}$ as shown by a left hand side portion in FIG. 5. When host vehicle speed $V_{car}$ becomes greater than a first predetermined speed V1 and until reaches a second predetermined speed V2 ($V1 < V_{car} \leq V2$), target inter-vehicle distance $DL_*$ increases according to the increase of host vehicle speed $V_{car}$ as shown by an intermediate portion in FIG. 5. When host vehicle speed $V_{car}$ becomes greater than the second predetermined speed V2 ($V2 < V_{car}$), target inter-vehicle distance DL is set a second constant value which is the same as that at second vehicle speed V2, as shown by a right hand side portion of FIG. 5.

At step S201, vehicle speed controller 9 determines whether or not a present inter-vehicle distance DL corresponds with target inter-vehicle distance $DL_*$. When the determination at step S201 is affirmative, the routine proceeds to step S202. When the determination at step S201 is negative, the routine proceeds to step S203.

At step S202, controller 9 sets a target engine torque $T_{torque*}$ at a previous target engine torque $T_{torque*}$ which has been set in the previous routine of the vehicle speed control. Further, controller 9 calculates the command engine torque and the shift command on the basis of target engine torque $T_{torque*}$, and outputs the command engine torque and the shift command to engine output controller 11 and transmission controller 12, respectively. Furthermore, controller 9 sets target brake pressure $B_*$ at "0" and outputs target brake pressure $B_*$ to brake hydraulic pressure controller 8. Then, the present routine of the automatic driving/braking force control is terminated.

At step S203, controller 9 determines whether a present inter-vehicle distance DL is greater than target inter-vehicle distance $DL_*$ or not. When the determination at step S203 is affirmative ($DL > DL_*$), the routine proceeds to step S205. When the determination at step S203 is negative, the routine proceeds to step S204.

At step S204, controller 9 sets target engine torque $T_{torque*}$ at "0". Further, vehicle speed controller 9 calculates the command engine torque and the shift command on the basis of target engine torque $T_{torque*}$ set at "0", and outputs the command engine torque and the shift command to engine output controller 11 and transmission controller 12, respectively. Furthermore, controller 9 sets target brake pressure $B_*$ at a value obtained by adding a correction value $\Delta B_*$ to a previous target value $B_*$ which has been set in the previous routine of the vehicle speed control ($B_* \leftarrow B_* + \Delta B_*$; wherein $\Delta B_* > 0$), and outputs the obtained target brake pressure $B_*$ to brake hydraulic pressure controller 8. Then, the present routine of the automatic driving/braking force control process is terminated.

At step S205, controller 9 sets target engine torque $T_{torque*}$ at a value obtained by adding a correction value $\Delta T_{torque*}$ to a previous target engine torque $T_{torque*}$ which has been set in the previous routine of the vehicle speed control ($T_{torque*} \leftarrow T_{torque*} + \Delta T_{torque*}$; wherein $\Delta T_{torque*} > 0$). Further, controller 9 calculates the command engine torque and the shift command on the basis of target engine torque $T_{torque*}$, and outputs the command engine torque and the shift command to engine output controller 11 and transmission controller 12, respectively. Furthermore, controller 9 sets target brake pressure $B_*$ at "0", and outputs the obtained target brake pressure $B_*$ to brake hydraulic pressure controller 8. Then, the present routine of the automatic driving/braking force control process is terminated.

Figure 6:
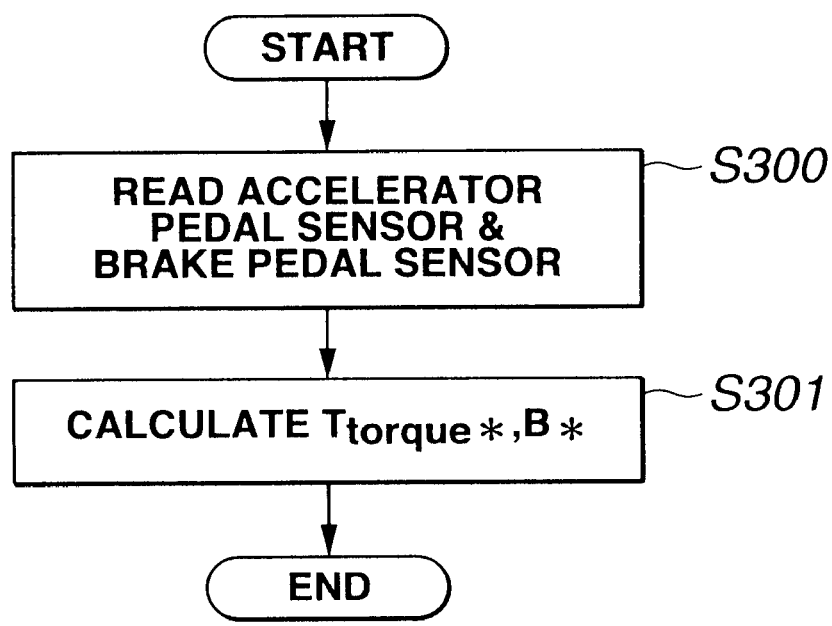
FIG. 6 is a flowchart showing a manual driving/braking force control process executed in the flowchart of FIG. 3.

Subsequently, the manual driving/braking force control process executed at step S110 in the flowchart of FIG. 3 will be discussed, with reference to a flowchart of FIG. 6.

At step S300, vehicle speed controller 9 reads detection results of accelerator pedal stroke sensor 18 and brake pedal stroke sensor 16.

At step S301, controller 9 sets target engine torque $T_{torque*}$ on the basis of the detection result of accelerator pedal stroke sensor 18. Further, controller 9 calculates the command engine toque and the shift command on the basis of the set target engine torque $T_{torque*}$, and outputs the command engine toque and the shift command to engine output controller 11 and transmission controller 12, respectively. Further, vehicle speed controller 9 sets target brake pressure $B_*$ according to the detection result of brake pedal stroke sensor 16 and outputs the set target brake pressure $B_*$ to brake hydraulic pressure controller 8. Then, the present routine of the manual driving/braking force control process is terminated.

Next, the manner of operation of the first embodiment of the adaptive cruise control system will be discussed. More specifically, there will be discussed the operation in case that the host vehicle equipped with the adaptive cruise control system according to the present invention travels on a highway.

First, it is assumed that radar device 13 can detect a preceding vehicle, that host vehicle speed $V_{car}$ is within the predetermined speed range and that the driver turns on main switch 22 and set switch 20 in the order of mention.

In this situation, at step S100 controller 9 reads the turn-on information that main switch 22 and set switch 20 are turned on. At step S101 controller 9 reads inter-vehicle distance DL from radar device 13, and reads host vehicle speed $V_{car}$ from vehicle speed sensor 14. Further, at step S102 controller 9 reads the information that brake pedal 10 is not depressed, from brake pedal stroke sensor 16. Subsequently, at step S103 controller 9 makes the affirmative determination since the condition for executing the control of host vehicle speed $V_{car}$ is satisfied. At step S104 controller 9 sets control flag F1 at "1" (F1=1). At step S105 controller 9 makes the negative determination, and at step S106 controller 9 makes the negative determination. Further, at step S108 controller 9 makes the affirmative determination. Therefore, at step S109 controller 9 executes the automatic driving/braking force control process.

By the execution of the automatic driving/braking force control process, at step S200 controller 9 calculates target inter-vehicle distance $DL_*$.

Herein, if inter-vehicle distance DL detected by radar device 13 is greater than target inter-vehicle distance $DL_*$ calculated at step S200, controller 9 makes the negative determination at step S201, and makes the affirmative determination at step S203. Accordingly, at step S205 controller 9 sets target engine torque $T_{torque*}$ at the value obtained by adding correction value $\Delta T_{torque*}$ to previous target engine torque $T_{torque*}$ ($T_{torque*} \leftarrow T_{torque*} + \Delta T_{torque*}$; wherein $\Delta T_{torque*} > 0$) Further, controller 9 calculates the command engine torque and the shift command on the basis of target engine torque $T_{torque*}$, and outputs the command engine torque and the shift command to engine output controller 11 and transmission controller 12, respectively. Furthermore, controller 9 sets target brake pressure $B_*$ at "0", and outputs the obtained target brake pressure $B_*$ to brake hydraulic pressure controller 8. Then, controller 9 terminates the present routine of the automatic driving/braking force control, and the routine of controller 9 returns to the vehicle speed control process of FIG. 3.

Accordingly, engine output controller 11 receives the command engine torque calculated by vehicle speed controller 9 and accelerates the host vehicle by controlling the opening of the throttle valve and the fuel injection quantity. Further, transmission controller 12 receives the shift command, and controls the shift position and the working fluid pressure adapted to the shift position in automatic transmission 3 so as to accelerate the host vehicle.

Further, brake hydraulic pressure controller 8 receives target brake pressure $B_*$ set at "0", and cancels the deceleration of the host vehicle by controlling the brake hydraulic pressure supplied to disc brakes 7 for the respective wheels 1FL, 1FR, 1RL and 1RR according to target brake pressure $B_*$ set at "0".

Herein, it is assumed that radar device 13 cannot detect the preceding vehicle since the preceding vehicle enters a curved road and departs from a detectable range of radar device 13, on the condition that the host vehicle is accelerated by the repeating execution of the above-discussed flow.

In this situation, at step S101 controller 9 reads inter-vehicle distance DL set at "0" from radar device 13. After the execution of steps S103 through S105, controller 9 makes the affirmative determination at step S106. Therefore, at step S107 controller 9 resets control flag F1 at "0" (F1=0). At step S108 controller 9 makes the negative determination. Therefore, controller 9 executes the manual driving/braking force control process at step S110.

By the execution of the manual driving/braking force control process, at step S300 controller 9 reads the detection results of accelerator pedal stroke sensor 18 and brake pedal stroke sensor 16.

At step S301 controller 9 sets target engine torque $T_{torque*}$ according to the detection result of accelerator pedal stroke sensor 18. Further, controller 9 calculates the command engine torque and the shift command on the basis of target engine torque $T_{torque*}$, and outputs the command engine torque and the shift command to engine output controller 11 and transmission controller 12, respectively. Furthermore, controller 9 sets target brake pressure $B_*$ according to the detection result of brake pedal stroke sensor 16 and outputs the set target brake pressure $B_*$ to brake hydraulic pressure controller 8. Then, the present routine of the manual driving/braking force control process is terminated.

As described above, the adaptive cruise control system of the first embodiment is arranged such that the adaptive cruise control system cancels the vehicle speed control and entrusts the control of the host vehicle to the driver when radar device 13 cannot detect the preceding vehicle. Accordingly, even if the preceding vehicle is decelerated just after the adaptive cruise control system cannot detect the preceding vehicle (loses the sight of the preceding vehicle), the excessive approach of the host vehicle to the preceding vehicle is prevented. Accordingly, this arrangement prevents the driver from having the strange feeling.

In this first embodiment, radar device 14 corresponds to a preceding vehicle detecting means. Step S109 in the flowchart of FIG. 3 corresponds to a host vehicle speed controlling means. Steps S106 through S108 correspond to a host vehicle control canceling means.

Although the first embodiment has been shown and described such that controller 9 determines whether radar device 13 cannot detect the preceding vehicle, that is, whether inter-vehicle distance DL detected by radar device 13 is "0" or not in order to determine the cancellation of the vehicle speed control, the vehicle speed control may be cancelled when controller 9 determines that the host vehicle travels at the low speed by comparing the host vehicle speed with a predetermined value, in addition to the "0" detecting result of radar device 13.

With this modified arrangement, when the host vehicle travels at high speed, the host vehicle may be kept at a predetermined set vehicle speed. This arrangement further improves the facility of the adaptive control system as compared with a method of entrusting the control of the host vehicle traveling at high speed to the driver. When the host vehicle travels at low speed, there are the variety of traveling circumstances, which include a road width, a congestion degree, weather and a road shape, as compared with those in high-speed traveling. Therefore, a condition that radar device 13 cannot detect the preceding vehicle in spite of presence of the preceding vehicle tends to occur in a low-speed traveling period as compared with a high-speed traveling period. The adaptive cruise control system of the first embodiment is arranged such that when the host vehicle travels at low speed, controller 9 entrusts the control of the host vehicle to the driver, and that when the host vehicle travels at high speed, the host vehicle speed control of the adaptive cruise control system is maintained. This arrangement suppresses the driver from having strange feeling and improves the facility of the adaptive cruise control.

Further, the adaptive cruise control system according to the present invention may be arranged such that at step S106 controller 9 determines whether the previous inter-vehicle distance DL detected by radar device 13 in the previous execution of the vehicle speed control is smaller than or equal to a predetermined value, in addition to the determination as to whether the newly detecting inter-vehicle distance DL is "0" or not. Further, when the above two conditions are satisfied, the control of host vehicle speed $V_{car}$ may be canceled. When inter-vehicle distance DL is large, the host vehicle normally travels at high speed.

With this another modified arrangement, even if the execution of the automatic driving/braking force control process is determined on the basis of inter-vehicle distance DL instead of hast vehicle speed $V_{car}$, the facility of the adaptive control system is improved. That is, when the host vehicle travels at high speed, controller 9 controls host vehicle speed $V_{car}$ at the predetermined set speed. When the host vehicle travels at low speed in which there is a high possibility of losing the sight of the preceding vehicle, the adaptive cruise control system cancels the vehicle speed control and entrusts the control of the host vehicle to the driver.

Furthermore, the adaptive cruise control system according to the present invention may be arranged such that at step S106 controller 9 determines whether the previous target brake pressure $B_*$ obtained in the previous execution of the vehicle speed control is "0" or not, in addition to the determination as to whether the newly detecting inter-vehicle distance DL is "0" or not. Further, when the above two conditions are satisfied, the control of host vehicle speed $V_{car}$ may be canceled.

With this further another modified arrangement, even during the host vehicle speed control by the adaptive cruise control system, it is possible to ensure the braking force and to prevent the driver from having the strange feeling.

Figure 7:
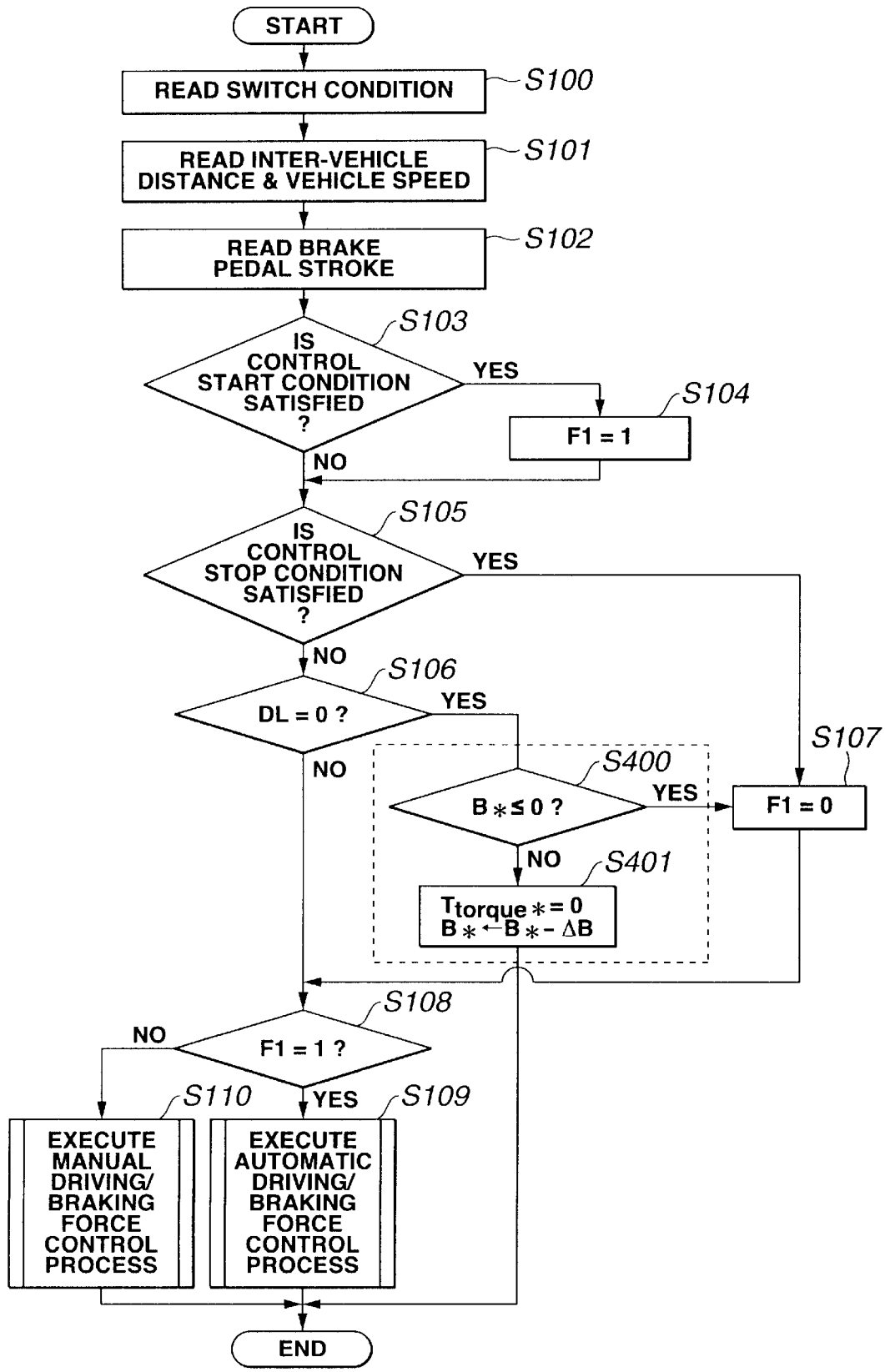
FIG. 7 is a flowchart showing the vehicle speed control process executed by the vehicle speed controller of a second embodiment.

Referring to FIG. 7, there is shown a second embodiment of the adaptive cruise control system according to the present invention.

The second embodiment is specially arranged such that when host vehicle speed $V_{car}$ is controlled by controlling the braking force and when radar device 13 cannot detect the preceding vehicle (loses the sight of the preceding vehicle), the control of the braking force is cancelled after the braking force is gradually decreased according to elapsed time.

More specifically, as shown in FIG. 7, steps S400 and S401 are newly added to the flowchart of FIG. 3 employed in the first embodiment. Accordingly, after the affirmative determination at step S106, at step S400 controller 9 determines whether or not target brake pressure $B_*$ is smaller than or equal to "0". When the determination at step S400 is affirmative ($B_* \leq 0$), the routine proceeds to step S107. When the determination at step S400 is negative, the routine proceeds to step S401. At step S401 controller 9 sets target engine torque $T_{torque*}$ at "0" ($T_{torque*}=0$). Further, controller 9 calculates the command engine torque and the shift command on the basis of target engine torque $T_{torque*}$ set at "0" and outputs the command engine torque and the shift command to engine output controller 11 and transmission controller 12, respectively. Furthermore, at step S401 controller 9 sets target brake pressure $B_*$ at a value obtained by subtracting a correction value $\Delta B_*$ from the previous target brake pressure $B_*$ set in the previous vehicle speed calculation process ($B_* \leftarrow B_* - \Delta B_*$, wherein $\Delta B_* > 0$). Further, controller 9 outputs the obtained target brake pressure $B_*$ to brake hydraulic pressure controller 8. The, the present routine is terminated. The other steps of FIG. 7 are basically the same as those of FIG. 3. Such steps are denoted by same reference numerals corresponding to those of FIG. 3 employed in the first embodiment, and the explanation thereof is omitted herein.

Next, the manner of operation of the second embodiment of the adaptive cruise control system will be discussed. More specifically, there will be discussed the operation in case that the host vehicle equipped with the adaptive cruise control system according to the present invention travels on a highway.

First, it is assumed that radar device 13 can detect a preceding vehicle, that host vehicle speed $V_{car}$ is within the predetermined speed range ($VL \leq V_{car} \leq VH$) and that the driver turns on main switch 22 and set switch 20 in the order of mention.

In this situation, controller 9 executes the automatic driving/braking force control process at step S109 in FIG. 7 after the execution of steps S100 through S106 and S108.

Figure 4:
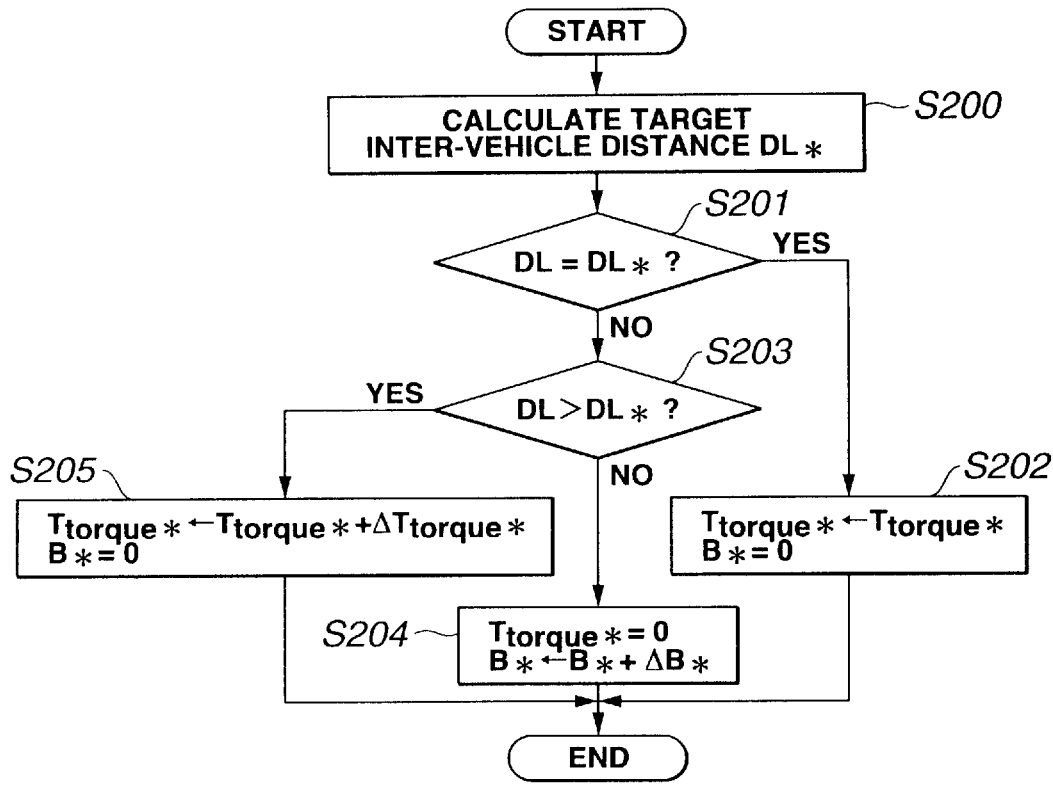
FIG. 4 is a flowchart showing an automatic driving/braking force control process executed in the flowchart of FIG. 3.

By the execution of the automatic driving/braking force control process shown by the flowchart of FIG. 4, at step S200 controller 9 calculates target inter-vehicle distance $DL_*$. Herein, if inter-vehicle distance DL detected by radar device 13 is smaller than target inter-vehicle distance $DL_*$ set at step S200, controller 9 makes the negative determinations at both of step S201 and step S203. Accordingly, at step S204 controller 9 sets target engine torque $T_{torque*}$ at "0". Further, vehicle speed controller 9 calculates the command engine torque and the shift command on the basis of target engine torque $T_{torque*}$, and outputs the command engine torque and the shift command to engine output controller 11 and transmission controller 12, respectively. Furthermore, controller 9 sets target brake pressure $B_*$ at a value obtained by adding the correction value $\Delta B_*$ to the previous target value $B_*$ which has been set in the previous routine of the vehicle speed control ($B_* \leftarrow B_* + \Delta B_*$; wherein $\Delta B_* > 0$), and outputs the obtained target brake pressure $B_*$ to brake hydraulic pressure controller 8. Then, the present routine of the automatic driving/braking force control is terminated.

Next, it is assumed that radar device 13 cannot detect the preceding vehicle since the preceding vehicle enters a curved road and departs from a detectable range of radar device 13, on the condition that the host vehicle is decelerated by the repeating execution of the above-discussed flow.

In this situation, at step S101 controller 9 reads inter-vehicle distance DL set at "0" from radar device 13. Then, controller 9 makes the affirmative determination at step S106 after the execution of steps S103 through S105. Since target brake pressure $B_*$ set in the previous automatic driving/braking force control process is greater than "0", controller 9 makes the negative determination at step S400. Therefore, at step S401 controller 9 sets target engine torque $T_{torque*}$ at "0". Further, controller 9 calculates the command engine torque and the shift command, and outputs control the command engine torque and the shift command to engine output controller 11 and transmission controller 12, respectively. Furthermore, at step S401 controller 9 sets target brake pressure $B_*$ at a value obtained by subtracting the correction value $\Delta B_*$ from the previous target brake pressure $B_*$ set in the previous vehicle speed calculation process ($B_* \leftarrow B_* - \Delta B_*$, wherein $\Delta B_* > 0$). Further, controller 9 outputs the obtained target brake pressure $B_*$ to brake hydraulic pressure controller 8. Then the present routine is terminated.

Further, it is assumed that target brake pressure $B_*$ is gradually decreased according to elapse of time and at last reaches "0" by repeatedly executing the above-discussed flow and that controller 9 makes the affirmative determination at step S400.

In this situation, the routine proceeds to step S107 wherein control flag F1 is reset at "0". Thereafter, at step S110 controller 9 executes the manual driving/braking force control process wherein controller 9 calculates the engine torque and the shift command calculated according to the detection result of accelerator pedal stroke sensor 18 and outputs them to engine output controller 11 and transmission controller 12, respectively. Further, controller 9 calculates target brake pressure $B_*$ according to the detection result of brake pedal stroke sensor 16 and outputs the calculated target brake pressure $B_*$ to brake hydraulic pressure controller 8.

With the thus arranged second embodiment of the adaptive cruise control system, when host vehicle speed $V_{car}$ is controlled by controlling the braking force and when the system cannot detect the preceding vehicle, controller 9 gradually decreases the braking force according to elapse of time and then cancels the control of the braking force. Therefore, when the host vehicle speed control is being executed, the braking force is smoothly changed, and thereby smoothly entrusting the driving operation of the host vehicle to the driver. Accordingly, the adaptive cruise control system prevents the driver from having strange feeling from the vehicle behavior of the host vehicle.

Figure 8:
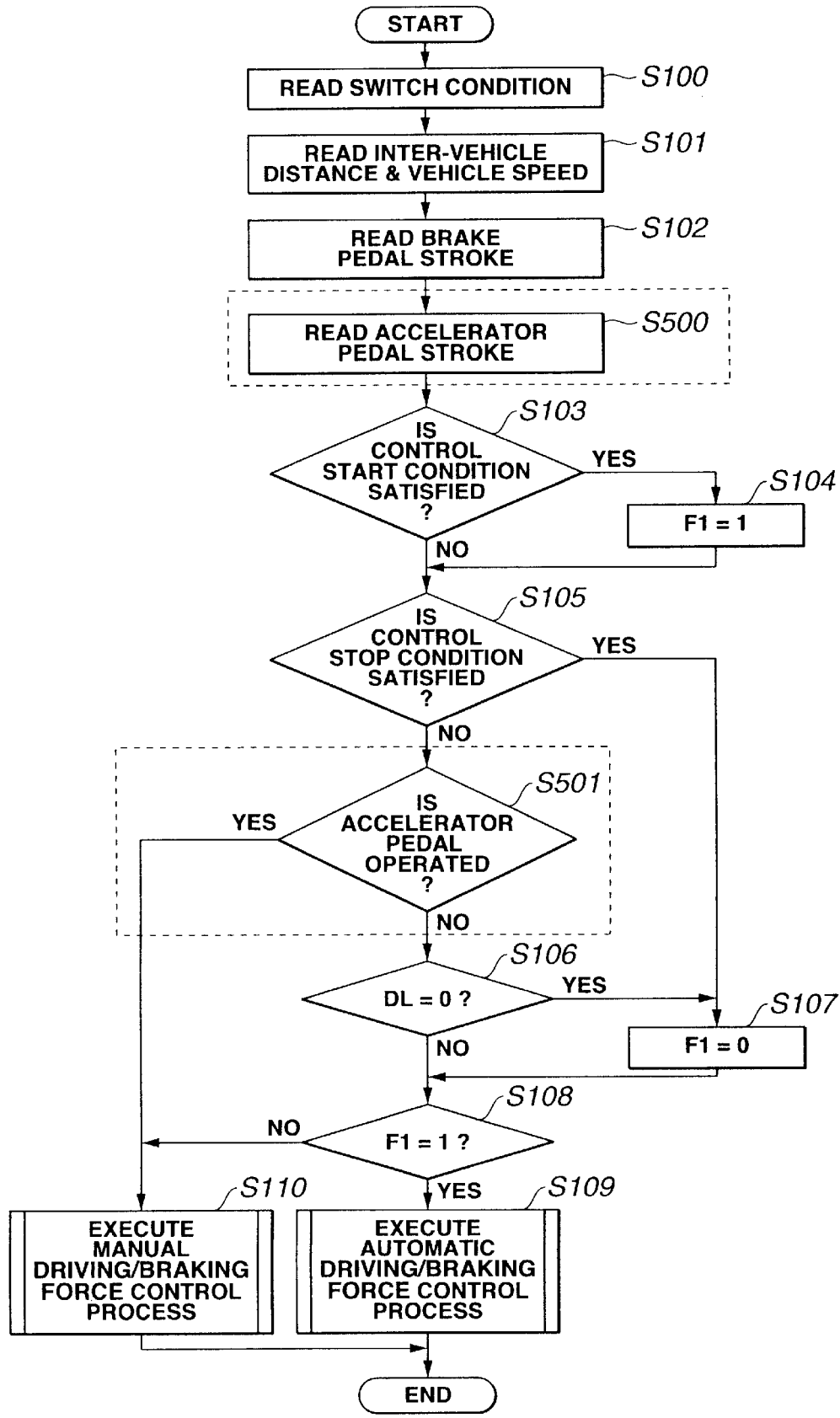
FIG. 8 is a flowchart showing the vehicle speed control process executed by the vehicle speed controller of a third embodiment.

Referring to FIG. 8, there is shown a third embodiment of the adaptive cruise control system according to the present invention.

The third embodiment is specially arranged such that the control of host vehicle speed $V_{car}$ is temporally stopped when controller 9 detects that the driver manipulates (depresses) accelerator pedal 17, and that the temporal stop of the control of host vehicle speed $V_{car}$ is maintained when the control of host vehicle speed $V_{car}$ is temporally stopped and when the system cannot detect the preceding vehicle (loses the sight of the preceding vehicle).

More specifically, as shown in FIG. 8, steps S500 and S501 are newly added to the flowchart of FIG. 3 employed in the first embodiment. Accordingly, after the execution of step S102, at step S500 controller 9 reads the information as to whether accelerator pedal 7 is depressed or not. Thereafter, the routine proceeds from step S500 to step S103. Further, after the negative determination at step S105, the routine proceeds to step S501 wherein controller 9 determines whether accelerator pedal 17 is operated or not. When the determination at step S501 is affirmative, the routine proceeds to step S110. When the determination at step S501 is negative, the routine proceeds to step S106. The other steps of FIG. 8 are basically the same as those of FIG. 3. Such steps are denoted by same reference numerals corresponding to those of FIG. 3 employed in the first embodiment, and the explanation thereof is omitted herein.

Next, the manner of operation of the third embodiment of the adaptive cruise control system will be discussed. More specifically, there will be discussed the operation in case that the host vehicle equipped with the adaptive cruise control system according to the present invention travels on a highway.

First, it is assumed that radar device 13 can detect a preceding vehicle, that host vehicle speed $V_{car}$ is within the predetermined speed range (VL$\leq V_{car} \leq$VH) and that the driver turns on main switch 22 and set switch 20 in the order of mention.

In this situation, at step S500 controller 9 reads the information indicative that accelerator pedal 17 is not operated from the signal of accelerator pedal stroke sensor 18 after the execution of steps S100 and S101. Further, after the execution of steps S103 through S105, controller 9 makes the negative determination at step S501. Furthermore, after the execution of steps S106 and S108, controller 9 executes the automatic driving/braking force control process at step S109.

By the execution of the automatic driving/braking force control process shown by the flowchart of FIG. 4, controller 9 calculates target inter-vehicle distance DL$_*$ at step S200. Herein, if inter-vehicle distance DL detected by radar device 13 is smaller than target inter-vehicle distance DL$_*$ set at step S200, controller 9 makes the negative determinations at both of step S201 and step S203 of FIG. 4. Accordingly, at step S204 controller 9 sets target engine torque $T_{torque*}$ at "0". Further, vehicle speed controller 9 calculates the command engine torque and the shift command on the basis of target engine torque $T_{torque*}$, and outputs the command engine torque and the shift command to engine output controller 11 and transmission controller 12, respectively. Furthermore, controller 9 sets target brake pressure B$_*$ at a value obtained by adding the correction value $\Delta$B$_*$ to the previous target value B$_*$ which has been set in the previous routine of the vehicle speed control (B$_* \leftarrow$B$_*$+$\Delta$B$_*$; wherein $\Delta$B$_*$>0), and outputs the obtained target brake pressure B$_*$ to brake hydrualic pressure controller 8. Then, the present routine of the automatic driving/braking force control is terminated.

Herein, it is assumed that the preceding vehicle is decelerated and therefore the driver operates steering wheel 19 to change a traveling lane and depresses accelerator pedal 17 in order to overtake the preceding vehicle, on the condition that the host vehicle is decelerated by the repeating execution of the above-discussed flow.

In this situation, controller 9 makes the affirmative determination at step S501. Therefore, the routine proceeds to step S110 wherein controller 9 executes the manual driving/braking force control process wherein controller 9 calculates the engine torque and the shift command calculated according to the accelerator stroke sensor 18 and outputs them to engine output controller 11 and transmission controller 12, respectively. Further, controller 9 calculates target brake pressure B$_*$ according to the detection result of brake pedal stroke sensor 16 and outputs the calculated target brake pressure B$_*$ to brake hydraulic pressure controller 8.

Further, it is assumed that the driver stops operating accelerator pedal 17 to accelerate the host vehicle when a new preceding vehicle appears on the changed lane and is detected by radar device 13 as a result of the acceleration of the host vehicle by the driver's operation after the host vehicle changes the traveling lane and overtakes the previous preceding vehicle.

In this situation, controller 9 makes the negative determination at step S501, and the routine proceeds through step S108 to step S109. Therefore, in this situation, controller 9 executes the automatic driving/braking force-control process so that the host vehicle follows the preceding vehicle.

Furthermore, it is assumed that the driver stops operating accelerator pedal 17 before the preceding vehicle enters a detectable range of radar device 13.

In this situation, controller 9 makes the negative determination at step S501 and makes the affirmative determination at step S106. Further, the routine proceeds through step S107 to step S108 wherein controller 9 makes the negative determination. Therefore, controller 9 executes the manual driving/braking force control process at step S109.

With the thus arranged third embodiment of the adaptive cruise control system, when controller 9 detects the accelerating operation of the driver, the host vehicle speed control of host vehicle speed $V_{car}$ is temporally stopped. Further, when the host vehicle speed control is temporally stopped, this temporal stop of the control of the host vehicle speed is maintained even if radar device 13 cannot detect a preceding vehicle. Therefore, when the driver stops the accelerating operation and when radar device 13 detects a preceding vehicle, controller 9 restarts the host vehicle speed control. Furthermore, when the driver stops the accelerating operation and when radar device 13 cannot detect a preceding vehicle, controller 9 cancels the host vehicle speed control. Accordingly, the driver can easily recognize a timing of canceling the host vehicle speed control, and can smoothly start the manual driving operation after the cancellation of the host vehicle speed control.

In this third embodiment, step S501 corresponds to an accelerator operation detecting means and a host-vehicle speed-control temporal-stop means.

Figure 9:
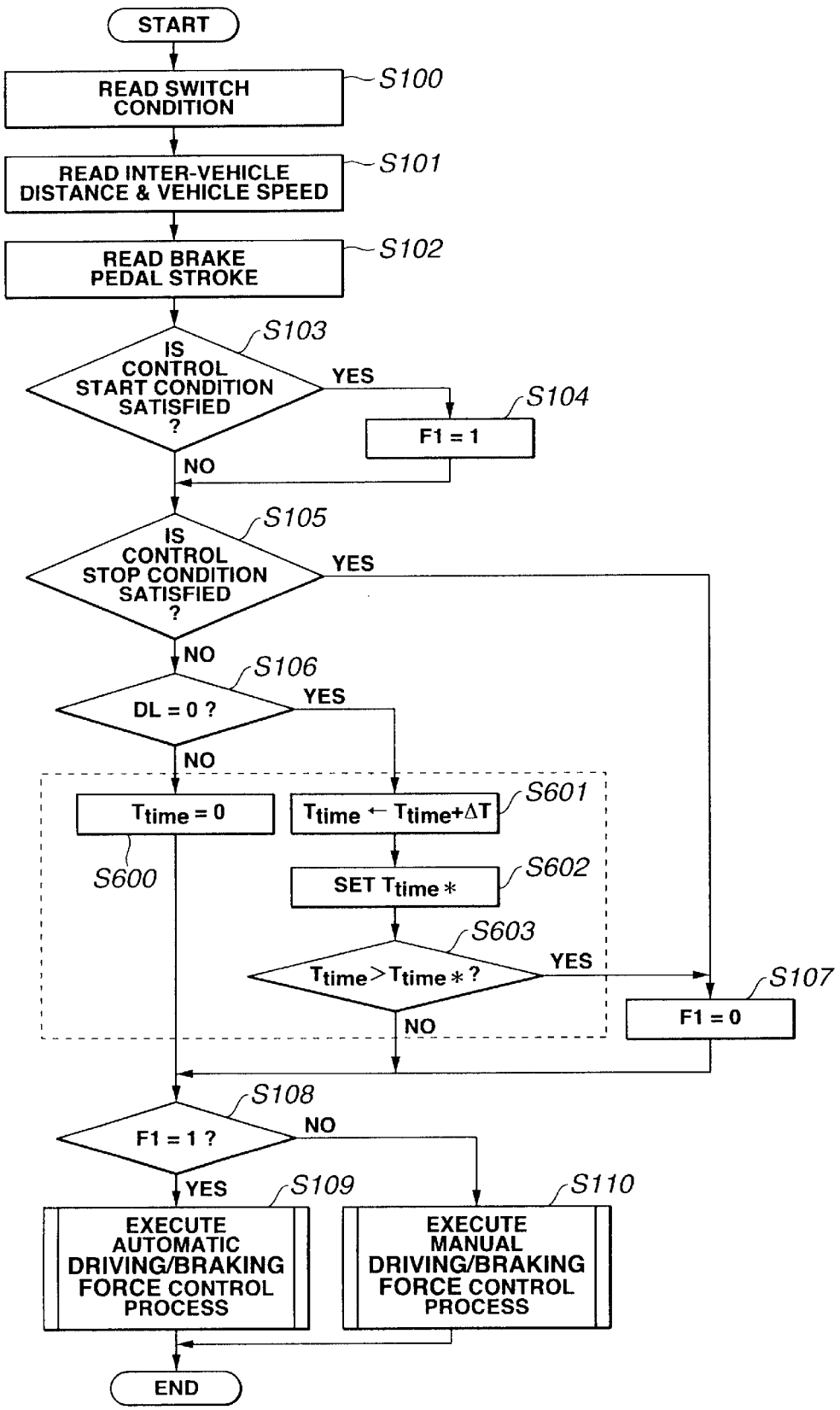
FIG. 9 is a flowchart showing the vehicle speed control process executed by the vehicle speed controller of a fourth embodiment.
Figure 10:
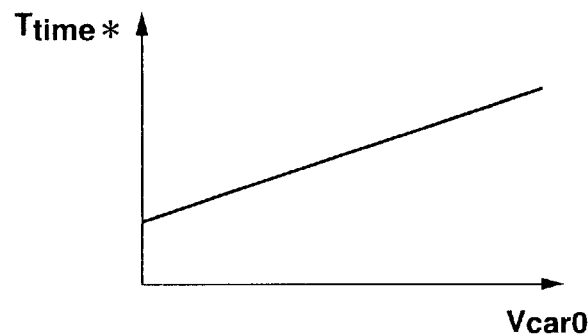
FIG. 10 is a control map employed in the calculation process of FIG. 9.

Referring to FIGS. 9 and 10, there is shown a fourth embodiment of the adaptive cruise control system according to the present invention.

The fourth embodiment is specially arranged such that the host vehicle speed control is cancelled when controller 9 cannot detect a preceding vehicle for a predetermined time period.

More specifically, as shown in FIG. 9, steps S601 through S603 are newly added to the flowchart of FIG. 3 employed in the first embodiment. Accordingly, when controller 9 makes the negative determination at step S106, the routine proceeds to step S600 wherein controller 9 resets a timer variable $T_{time}$ at "0". Then the routine proceeds to step S108. When controller 9 makes the affirmative determination at step S106, controller 9 executes steps S601, S602 and S603, in the order of mention.

That is, at step S601 subsequent to the affirmative determination, controller 9 adds the control cycle period (interval) $\Delta T$ of the vehicle speed control calculation process to timer variable $T_{time}$ ($T_{time} \leftarrow \Delta T + T_{time}$).

At step S602, controller 9 sets a time threshold $T_{time*}$ employed in the cancellation of the vehicle speed control, on the basis of a relationship shown in FIG. 10 and a host vehicle speed $V_{car0}$ at a detection-incapable moment that controller 9 cannot detect a preceding vehicle. FIG. 10 shows the relationship between time threshold $T_{time*}$ and host vehicle speed $V_{car0}$ at the detection incapable moment when controller 9 cannot detect the preceding vehicle. As is clear from FIG. 10, when host vehicle speed $V_{car0}$ at the detection incapable moment is large, time threshold $T_{time*}$ is set at a larger value. That is, time threshold $T_{time*}$ increases according to the increase of detection-incapable-moment host vehicle speed $V_{car0}$.

At step S603, controller 9 determines whether timer variable $T_{time}$ is greater than time threshold $T_{time*}$ or not. When the determination at step S603 is affirmative ($T_{time} > T_{time*}$), the routine proceeds to step S107. When the determination at step S603 is negative ($T_{time} \leq T_{time*}$), the routine proceeds to step S108.

The other steps of FIG. 9 are basically the same as those of FIG. 3. Such steps are denoted by same reference numerals corresponding to those of FIG. 3 employed in the first embodiment, and the explanation thereof is omitted herein.

Next, the manner of operation of the fourth embodiment of the adaptive cruise control system will be discussed. More specifically, there will be discussed the operation in a situation that the host vehicle equipped with the adaptive cruise control system according to the present invention travels on a highway.

First, it is assumed that the driver turns on main switch 22 and set switch 20 in the order of mention when radar device 13 can detect a preceding vehicle and when host vehicle speed $V_{car}$ is within the predetermined speed range ($VL \leq V_{car} \leq VH$).

In this situation,-at step S600 controller 9 resets timer variable $T_{time}$ at "0" ($T_{time}=0$) after the execution of step S100 through step S106. Further, controller 9 makes the affirmative determination at step S108. Therefore, the routine proceeds to step S109 wherein controller 9 executes the automatic driving/braking force control process.

Herein, it is assumed that radar device 13 cannot detect the preceding vehicle since the preceding vehicle enters a curved road and departs from a detectable range of radar device 13, on the condition that the driving/braking force of the host vehicle is controlled by the repeating execution of the above-discussed flow.

In this situation, at step S101 controller 9 reads inter-vehicle distance DL set at "0" from radar device 13. After the execution of steps S103 through S105, controller 9 makes the affirmative determination at step S106. Therefore, controller 9 increments timer variable $T_{time}$ by $\Delta T$ ($T_{time} \leftarrow \Delta T + T_{time}$) at step S601. At step S602 controller 9 sets time threshold $T_{time*}$ on the basis of the map of FIG. 10 and detection-incapable-moment host vehicle speed $V_{car0}$. At step S603 controller 9 makes the negative determination. Further, since controller 9 makes the affirmative determination at step S108, the routine proceeds to step S109 wherein controller 9 executes the automatic driving/braking force control process.

Further, it is assumed that timer variable $T_{time}$ becomes greater than time threshold $T_{time*}$ after a predetermined time elapsed from a moment that the preceding vehicle departs from the detecting range of radar device 13.

In this situation, controller 9 makes the affirmative determination at step S603, and thereby resetting control flag F1 at "0" (F1=0) at step S107. Therefore, controller 9 makes the negative determination at step S108, and therefore controller 9 executes the manual driving/braking force control process at step S110.

With the thus arranged fourth embodiment of the adaptive cruise control system, controller 9 cancels the host vehicle speed control when controller 9 cannot detect the preceding vehicle for a predetermined time period. Accordingly, even if it becomes temporally impossible to detect the preceding vehicle due to noises and the like, the host vehicle speed control is maintained. This arrangement improves the facility of the adaptive cruise control system.

Further, since the fourth embodiment is arranged to determine time threshold $T_{time*}$ according to detection-incapable-moment host vehicle speed $V_{car0}$, the adaptive cruise control system quickly entrusts the control of the host vehicle to the driver when the host vehicle travels at low speed wherein inter-vehicle distance is relatively small. Further, the adaptive cruise control system delays the cancellation of the host vehicle speed control when the vehicle travels at high speed. This arrangement improves the facility of the adaptive cruise control.

Figure 11A:
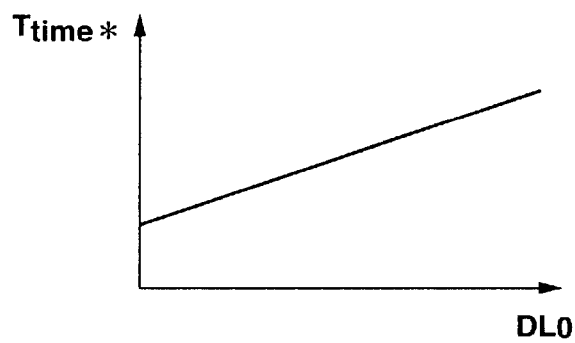
FIGS. 11A, 11B and 11C are controls maps employed in modifications of the fourth embodiment.

Although the fourth embodiment has been shown and described such that controller 9 employs the control map of FIG. 10 at step S602 in order to determine time threshold $T_{time*}$ employed in determining the cancellation of the host vehicle speed control, time threshold $T_{time*}$ may be determined on the basis of a relationship between time threshold $T_{time*}$ and an inter-vehicle distance DL0 at a moment just before it becomes impossible to detect the preceding vehicle, as shown in FIG. 11A.

Generally, inter-vehicle distance DL decreases as host vehicle speed $V_{car}$ decreases, and inter-vehicle distance DL increases as host vehicle speed $V_{car}$ increases. That is, inter-vehicle distance DL is generally varied according to the change of host vehicle speed $V_{car}$. Therefore, by setting time threshold $T_{time*}$ according to the inter-vehicle distance DL0 such that time threshold $T_{time*}$ is set at a large value when inter-vehicle $V_{car0}$ is large and that time threshold $T_{time*}$ is set at a small value when inter-vehicle $V_{car0}$ is small. With this arrangement, the adaptive cruise control system quickly entrusts the control of the host vehicle to the driver when the host vehicle travels at low speed wherein inter-vehicle distance is relatively small. Further, the adaptive cruise control system delays the cancellation of the host vehicle speed control when the vehicle travels at high speed. This arrangement improves the facility of the adaptive cruise control.

Figure 11B:
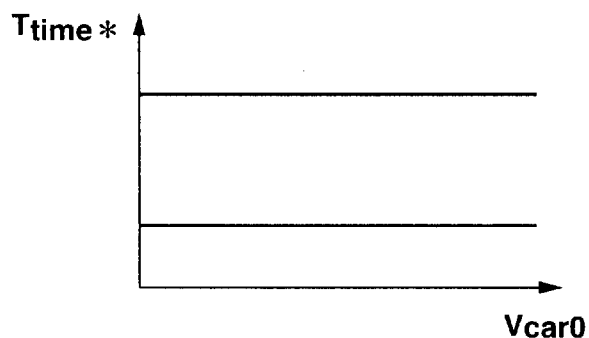
Figure 11C:
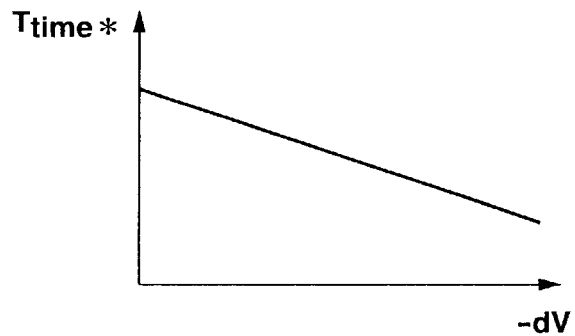

Further, time threshold $T_{time*}$ may be determined on the basis of a control condition of the braking force as shown in FIG. 11B. More specifically, time threshold $T_{time*}$ may be set upon taking account of whether or not the braking force is being generated on the condition that radar device 13 cannot detect the preceding vehicle. That is, time threshold $T_{time*}$ is set at a large value-when the braking force is operating at a moment that it becomes impossible to detect the preceding vehicle. Further, time fifth embodiment of the adaptive cruise control system according to the present invention.

The fifth embodiment is specially arranged such that the host vehicle speed control is temporally stopped (cancelled) when controller 9 detects an accelerating operation of the driver and that time threshold $T_{time*}$ is increased when the host vehicle speed is restarted and when radar device 13 cannot detect the preceding vehicle. As shown in FIG. 12, step S700 through S707 are newly added to the flowchart of FIG. 3 employed in the first embodiment.

More specifically, after the execution of step S102, the routine of FIG. 12 proceeds to step S700 wherein controller 9 reads information as to whether accelerator pedal 17 is depressed on the basis of the detection result of accelerator stroke sensor 18. Then, the routine proceeds from step S700 to step S103. Further, after the negative determination at step S105, at step S701 controller 9 determines whether or not accelerator pedal 17 is operated. When the determination at step S701 is affirmative, the routine proceeds to step S702 wherein controller 9 sets an acceleration flag F2 indicative that accelerating operation being executed at "1" (F2=1). When the determination at step S701 is negative, the routine proceeds to step S106.

Further, after the negative determination at step S106, the routine proceeds to step S703 wherein controller 9 sets timer variable $T_{time}$ at "0" ($T_{time}=0$). Then, the routine proceeds from step S703 to step S704 wherein controller 9 resets acceleration flag F2 at "0" (F2=0). Then the routine proceeds to step S108. threshold $T_{time*}$ is set at a small value when the braking force is not operating at a moment that it becomes impossible to detect the preceding vehicle. With this arrangement, even when radar device 13 temporally loses the sight of the preceding vehicle because the preceding vehicle departs from the detectable range of radar device 13 due to the posture change of the host vehicle by braking, the host vehicle speed control is maintained. This arrangement improves the facility of the adaptive cruise control system.

Furthermore, time threshold $T_{time*}$ may be determined on the basis of a relative speed dV of the preceding vehicle relative to the host vehicle as shown in FIG. 1C. More specifically, time threshold $T_{time*}$ may be decreased as relative speed dV takes a negative value and increases its absolute value. With this arrangement, by decreasing time threshold $T_{time*}$ according to the increase of the absolute value of negative relative speed dV when the host vehicle is approaching the preceding vehicle, it becomes possible that the adaptive cruise control system according to the present invention more quickly entrusts the driving operation of the host vehicle to the driver as the approaching speed between the host vehicle and the preceding vehicle increases. This arrangement prevents the driver from having strange feeling. Relative speed dV is obtained by differentiating time-series data of inter-vehicle distance DL or by processing the time-series data by a band-pass filter.

Figure 13:
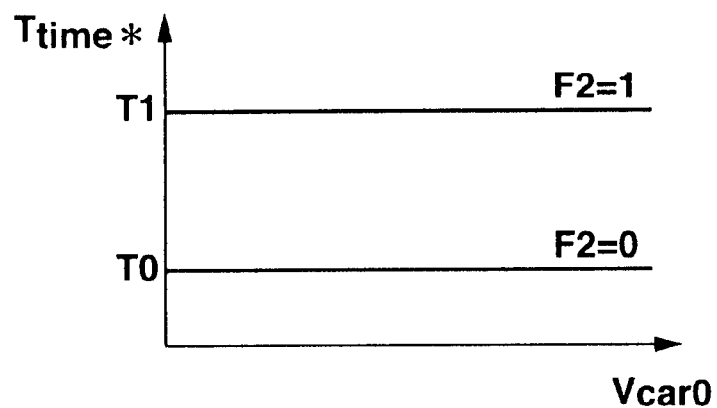
FIG. 13 is a control map employed in the calculation process of the fifth embodiment.

Referring to FIGS. 12 and 13, there is shown a

Furthermore, after the affirmative determination at step S106, the routine proceeds to step S705 wherein controller 9 increments timer variable $T_{time}$ by control cycle period $\Delta T$ ($T_{time} \leftarrow T_{time}+\Delta T$). At step S706 subsequent to the execution of step S705, controller 9 sets time threshold $T_{time*}$ at a large value T1 ($T_{time*}=T1$) when acceleration flag F2 is set at "1" (F2=1), and sets timer variable $T_{time*}$ at a small value T0 ($T_{time*}=T0$) when acceleration flag F2 is set at "0" (F2=0), as shown by a map in FIG. 13. At step S707 subsequent to the execution of step S706, controller 9 determines whether or not timer variable $T_{time}$ is greater than timer threshold $T_{time*}$. When the determination at step S707 is affirmative, the routine proceeds to step S107. When the determination at step S707 is negative, the routine proceeds to step S108. The other steps are basically the same as those of FIG. 3 of the first embodiment. These same steps are denoted by the same reference numerals of FIG. 3, and the explanation thereof is omitted herein.

Next, the manner of operation of the fifth embodiment of the adaptive cruise control system will be discussed. More specifically, there will be discussed the operation in case that the host vehicle equipped with the adaptive cruise control system according to the present invention travels on a highway.

First, it is assumed that the driver turns on main switch 22 and set switch 20 in the order of mention when radar device 13 can detect a preceding vehicle and when host vehicle speed $V_{car}$ is within the predetermined speed range (VL $\leq V_{car} \leq$ VH).

In this situation, at step S700 controller 9 reads the information that accelerator pedal 17 is not operated by the driver, after the execution of steps S100 through step S102. After the execution of step S103 through S105, controller 9 makes the negative determination at steps S701 and S106. Therefore, the routine proceeds to step S703 wherein timer variable $T_{time}$ is reset ($T_{time}=0$). Then, at step S704 controller 9 resets acceleration flag F2 (F2=0). Further, the routine proceeds through step S108 to step S109 wherein controller 9 executes the automatic driving/braking force control.

Further, it is assumed that the driver controls steering wheel 19 and further depresses accelerator pedal 17 to change a traveling lane and to overtake a preceding vehicle, on the condition that the driving/braking force of the host vehicle is controlled by the repeating execution of the above-discussed flow.

In this situation, at step S701 controller 9 makes the affirmative determination, and at step S702 controller 9 sets acceleration flag F2 at "1" (F2=1). Therefore, controller 9 executes the manual driving/braking force control process at step S110 wherein controller 9 calculates the command engine torque and the shift command according to the detection result of accelerator pedal stroke sensor 18 and outputs the command engine torque and the shift command to engine output controller 11 and transmission controller-13, respectively. Further, controller 9 calculates target brake pressure $B_*$ according to the detection result of brake pedal stroke sensor 16, and outputs target brake pressure $B_*$ to brake hydraulic pressure controller 16. Then controller 9 terminates the present vehicle speed control calculation process.

Furthermore, it is assumed that the preceding vehicle located near the host vehicle cannot be detected by radar device 13 since the host vehicle is encountered with the following situation:

When the host vehicle was accelerated by depressing accelerator pedal 17, a new preceding vehicle appeared on a changed new lane. Then, when the preceding vehicle was located in the detectable range of radar device 13, the driver stopped operating accelerator pedal 17. However, the host vehicle changed its posture so as to be incapable of detecting the preceding vehicle.

In this situation, at step S101 controller 9 reads inter-vehicle distance DL as "0". Then, the routine proceeds through steps S102, S700, S103, S104 and S105 to step S701 wherein controller makes the negative determination. At step S106 controller 9 makes the affirmative determination. Therefore, controller 9 increments timer variable $T_{time}$ by control cycle period $\Delta T$ ($T_{time} \leftarrow T_{time}+\Delta T$) at step S705. At step S706 controller 9 sets time threshold $T_{time*}$ at large value T1 ($T_{time*}=T1$). At step S707 controller 9 makes the negative determination. Further, at step 108 controller 9 makes the affirmative determination. Therefore, at step S109 controller 9 executes the automatic driving/braking force control process.

With the thus arranged fifth embodiment of the adaptive cruise control system according to the present invention, even when radar device 13 cannot temporally detect the preceding vehicle located near the host vehicle due to the change of vehicle posture caused by accelerating operation, the host vehicle speed control is maintained. This arrangement improves the facility of the control.

Figure 15:
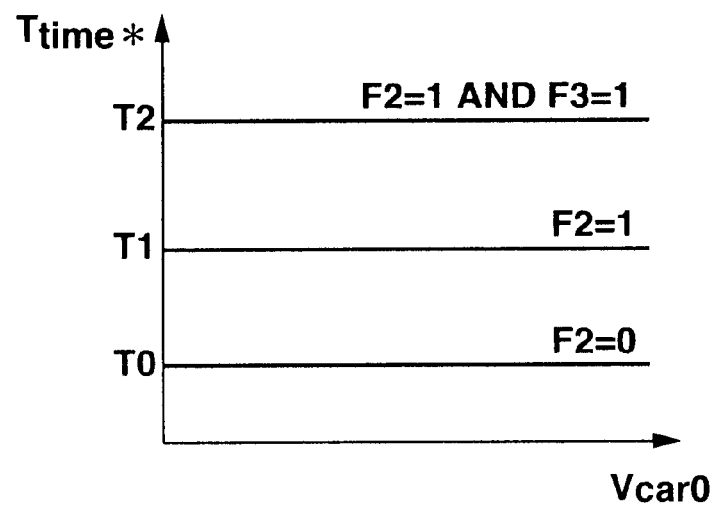
FIG. 15 is a control map employed in the calculation process of the sixth embodiment.
Figure 14:
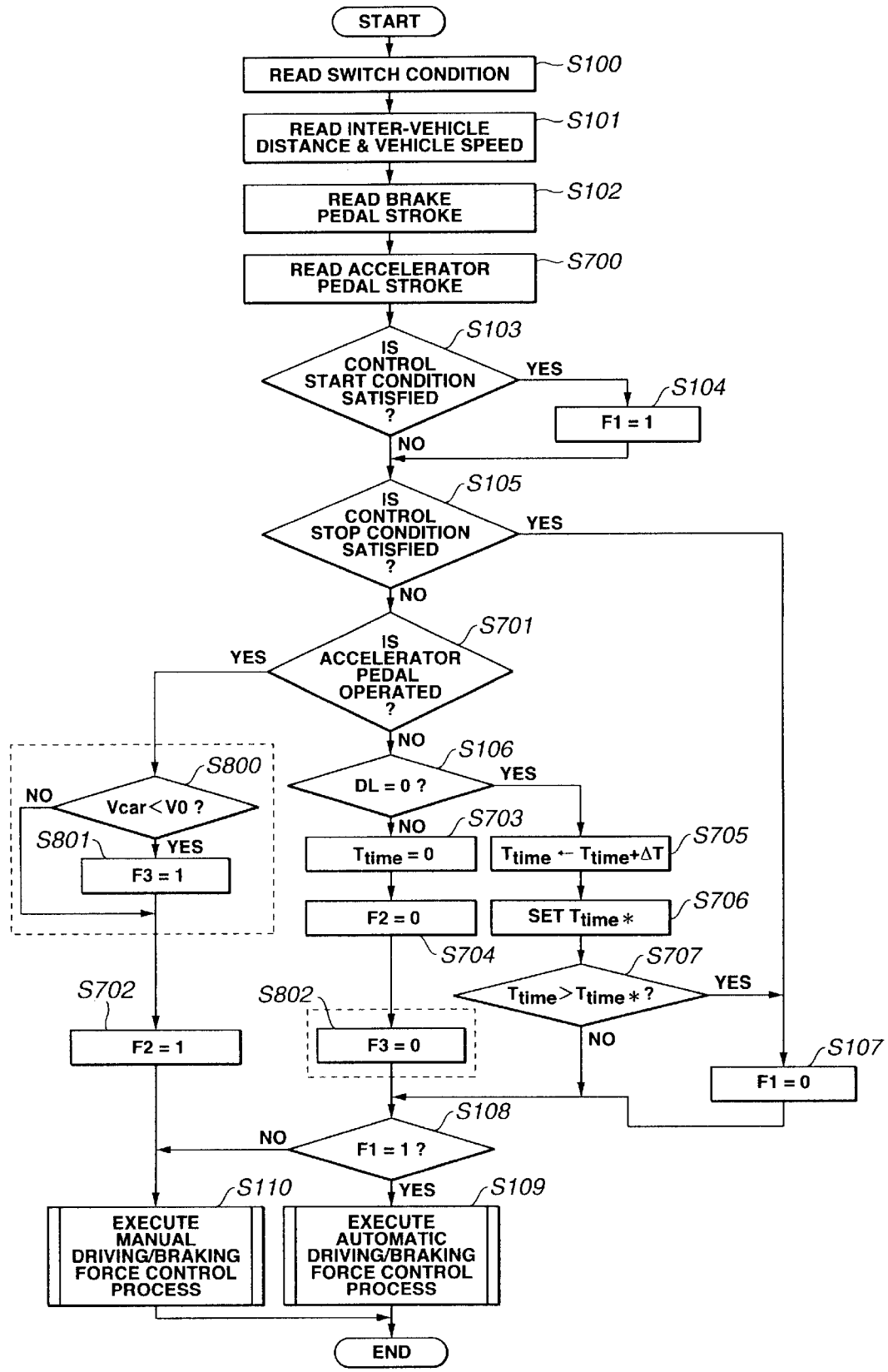
FIG. 14 is a flowchart showing the vehicle speed control process executed by the vehicle speed controller of a sixth embodiment.

Referring to FIGS. 14 and 15, there is shown a sixth embodiment of the adaptive cruise control system according to the present invention.

The sixth embodiment is specially arranged such that the host vehicle speed control is temporally stopped when radar device 13 can detect an accelerating operation executed by the driver, that the host vehicle speed control is temporally stopped when controller 9 detects a vehicle starting operation executed by the driver, and that time threshold $T_{time*}$ is increased when the host vehicle speed is restarted and when radar device 13 cannot detect the preceding vehicle. As shown in FIG. 14, steps S800, S801 and S802 are newly added to the flowchart of FIG. 12 employed in the fifth embodiment.

More specifically, after the affirmative determination at step S701, the routine proceeds to step S800 wherein controller 9 determines whether host vehicle speed $V_{car}$ is smaller than a creep speed indicative value V0 at which the host vehicle under idling condition runs. When the determination at step S800 is affirmative, the routine proceeds to step S801 wherein controller 9 sets a start flag F3 at "1" indicative that the driver executes a vehicle start operation (F3=1). After the execution of step S801, the routine proceeds to step S702. Further, when the determination at step S800 is negative, the routine proceeds to step S702.

Further, after the execution of step S704, the routine proceeds to step S802 wherein controller 9 sets start flag F3 at "0" (F3=0). Thereafter, the routine proceeds to step S108. Furthermore, at step S706, controller 9 sets time threshold $T_{time*}$ with reference to a map of FIG. 15. More specifically, as clearly shown in FIG. 15, when acceleration flag F2 is set at "0" (F2=0), time threshold $T_{time*}$ is set at a small value T0 ($T_{time*}$=T0). When acceleration flag F2 is set at "1" (F2=1), time threshold $T_{time*}$ is set at an intermediate value T1 ($T_{time*}$=T1). Further, when both of acceleration flag F2 and start flag F3 are set at "1" (F2=1 and F3=1), time threshold $T_{time*}$ is set at a large value T2 ($T_{time*}$=T2). The relationship among T2, T1 and T0 is T2>T1>T0.

The other steps are basically the same as those of FIG. 12 of the fifth embodiment. These same steps are denoted by the same reference numerals, and the explanation thereof is omitted herein.

Next, the manner of operation of the sixth embodiment of the adaptive cruise control system will be discussed. More specifically, there will be discussed the operation in case that the host vehicle equipped with the adaptive cruise control system according to the present invention travels on a highway.

First, it is assumed that the driver turns on main switch 22 and set switch 20 in the order of mention when radar device 13 can detect a preceding vehicle and when host vehicle speed $V_{car}$ is within the predetermined speed range (VL≦$V_{car}$≦VH).

In this situation, controller 9 makes the negative determination at step S701 and step S16 after the execution of step S100 through S105. Therefore, the routine proceeds through step S703 and step S704 to the step S802 wherein controller 9 resets start flag F3 at "0" (F3=0). Further, the routine proceeds through step S108 to step S109 wherein controller 9 executes the automatic driving/braking force control.

Further, it is assumed that the driver controls accelerator pedal 17 to start the host vehicle just after the driver controlled brake pedal 10 to step the host vehicle in reply to the motion of the preceding vehicle which is stopped by a traffic congestion and quickly restarted, on the condition that the driving/braking force of the host vehicle is controlled by the repeating execution of the above-discussed flow.

In this situation, at step S701 controller 9 makes the affirmative determination both at step S701 and S800. Further, at step S801 controller 9 sets acceleration flag F2 at "1". Therefore, at step S110 controller 9 executes the manual driving/braking force control process. That is, controller 9 calculates the command engine torque and the shift command according to the detection result of accelerator pedal stroke sensor 18 and outputs the command engine torque and the shift command to engine output controller 11 and transmission controller 13, respectively. Further, controller 9 calculates-target brake pressure $B_*$ according to the detection result of brake pedal stroke sensor 16, and outputs target brake pressure $B_*$ to brake hydraulic pressure controller 16. Then controller 9 terminates the present vehicle speed control calculation process.

Furthermore, it is assumed that the preceding vehicle located near the host vehicle cannot be detected by radar device 13 due to excessively small inter-vehicle distance DL out of the detectable range of radar device 13.

In this situation, at step S101 controller 9 reads the information indicative that inter-vehicle distance DL is set at "0". After the execution of steps S102 to S105, at step S701 controller 9 makes the negative determination. At step S106 controller 9 makes the affirmative determination. Therefore, the routine proceeds to step S705 wherein controller 9 increments timer variable $T_{time}$ by control cycle period ΔT ($T_{time}$←$T_{time}$+ΔT). At step S706 controller 9 sets time threshold $T_{time*}$ at large value T2 ($T_{time*}$=T2). At step S707 controller 9 makes the negative determination. Further, at step 108 controller 9 makes the affirmative determination. Therefore, the routine proceeds to step S109 wherein controller 9 executes the automatic driving/braking force control process.

With the thus arranged sixth embodiment of the adaptive cruise control system according to the present invention, even when radar device 13 cannot temporally detect the preceding vehicle which is located near the host vehicle, the adaptive cruise control system continues the host vehicle speed control. This arrangement improves the facility of the control.

In this sixth embodiment, steps S800 and S801 correspond to a start operation detecting means.

Although the preferred embodiments of the present invention have been shown and described such that a laser radar is employed as radar device 13, it will be understood that radar device 13 is not limited to this and may employ a millimeter wave radar or other distance-measuring device. Further, although the preferred embodiments have been shown and described such that vehicle speed controller 9 executes the calculation process in the form of software, it will be understood that such calculation process of the invention is not limited to this and may employ a hardware of electronic circuit constituted by assembling function generators, comparators, calculators and the like.

Further, while the preferred embodiments have been shown and described such that disc brake 7 is employed as a brake actuator, the brake actuator is not limited to this and may be a drum brake or other actuators. Further, an electrically controlled brake actuator may be employed.

Although the preferred embodiments have been shown and described such that engine 2 is employed as a source of rotational driving force, it will be understood that an electric motor may be employed as a source of rotational driving force. Further, a hybrid vehicle equipped with an internal combustion engine and an electric motor may be employed.

The entire contents of Japanese Patent Application No. 2001-88065 filed on Mar. 26, 2001 in Japan are incorporated herein by reference.

Although the invention has been described above by reference to certain embodiments of the invention, the invention is not limited to the embodiments described above. Modifications and variations of the embodiments described above will occur to those skilled in the art, in light of the above teaching. The scope of the invention is defined with reference to the following claims.

What is claimed is:

1. An adaptive cruise control system for a host vehicle, comprising:
   a preceding vehicle detecting device configured to detect a preceding vehicle ahead of the host vehicle and to obtain an inter-vehicle distance between the host vehicle and the preceding vehicle on the basis of the detection result of the preceding vehicle detecting device;
   a vehicle speed detecting device detecting a host vehicle speed of the host vehicle; and
   a controller coupled to the preceding vehicle detecting device and the vehicle speed detecting device, the controller being arranged
   to execute a vehicle speed control of the host vehicle on the basis of detection results of the preceding vehicle detecting device and the vehicle speed detecting device, and
   to cancel the vehicle speed control when: a) the preceding vehicle detecting device is incapable of detecting the preceding vehicle; and b) the inter-vehicle distance obtained at a moment just before the preceding vehicle detecting device becomes incapable of detecting the preceding vehicle is smaller than or equal to a predetermined value.

2. The adaptive cruise control system as claimed in claim 1, wherein the controller cancels the vehicle speed control when the host vehicle speed is smaller than or equal to a predetermined value.

3. The adaptive cruise control system as claimed in claim 1, wherein the controller decreases the braking force according to elapse of time when the controller is executing the vehicle speed control and when the preceding vehicle detecting device is incapable of detecting the preceding vehicle, and the controller cancels the vehicle speed control when a magnitude of the braking force is smaller than a predetermined value.

4. The adaptive cruise control system as claimed in claim 1, further comprising an accelerating operation detecting device for detecting a driver's accelerating operation, wherein the controller temporally stops the vehicle speed control when the accelerating operation detecting device detects the driver's accelerating operation, and the controller maintains a temporal stop state of the vehicle speed control when the controller temporally stops the host vehicle speed control and when the preceding vehicle detecting device is incapable of detecting the preceding vehicle.

5. The adaptive cruise control system as claimed in claim 1, wherein the controller cancels the vehicle speed control when a condition that the preceding vehicle detecting device is incapable of detecting the preceding vehicle is continued for a predetermined time period.

6. The adaptive cruise control system as claimed in claim 5, wherein the controller determines the predetermined time period on the basis of the host vehicle speed detected at a moment when the preceding vehicle detecting device is incapable of detecting the preceding vehicle.

7. The adaptive cruise control system as claimed in claim 5, wherein the controller obtains an inter-vehicle distance between the host vehicle and the preceding vehicle on the basis of the detection result of the preceding vehicle detecting device, and the controller determines the predetermined time period on the basis of the inter-vehicle distance obtained at a moment when the preceding vehicle detecting device is incapable of detecting the preceding vehicle.

8. The adaptive cruise control system as claimed in claim 5, wherein the controller determines the predetermined time period on the basis of the braking force controlled by the controller.

9. The adaptive cruise control system as claimed in claim 5, further comprising an accelerating operation detecting device for detecting a driver's accelerating operation,
   wherein the controller temporally stops the vehicle speed control when the accelerating operation detecting device detects the driver's accelerating operation, and the controller maintains a temporal stop state of the vehicle speed control when the controller temporally stops the host vehicle speed control and when the preceding vehicle detecting device is incapable of detecting the preceding vehicle.

10. The adaptive cruise control system as claimed in claim 5, further comprising an accelerating operation detecting device for detecting a driver's accelerating operation, the controller detecting a vehicle starting operation on the basis of the detection result of the accelerating operation detecting device, wherein the controller temporally stops the host vehicle control when the accelerating operation detecting device detects the driver's accelerating operation, the controller increasing the predetermined time period when the preceding vehicle detecting device is incapable of detecting the preceding vehicle under a condition that the host vehicle speed control is restarted.

11. The adaptive cruise control system as claimed in claim 5, wherein the controller calculates a relative speed between the preceding vehicle and the host vehicle on the basis of the detection results of the preceding vehicle detecting device and the vehicle speed detecting device, and the controller determines the predetermined time period on the basis of the relative speed obtained at a moment when the preceding vehicle detecting detector is incapable of detecting the preceding vehicle.

12. A method of controlling an adaptive cruise of a host vehicle, comprising:
   detecting a preceding vehicle ahead of the host vehicle;
   obtaining an inter-vehicle distance between the host vehicle and the preceding vehicle on the basis of said detecting;
   detecting a host vehicle speed of the host vehicle;
   executing a vehicle speed control for controlling the host vehicle speed on the basis of a detected state of the preceding vehicle and the detected host vehicle speed; and
   canceling the vehicle speed control when: a) the preceding vehicle is incapable of being detected; and b) the inter-vehicle distance obtained at a moment just before the preceding vehicle is incapable of being detected is smaller than or equal to a predetermined value.

13. An adaptive cruise control system for a host vehicle, comprising:
   preceding vehicle detecting means for detecting a preceding vehicle ahead of the host vehicle and for obtaining an inter-vehicle distance between the host vehicle and the preceding vehicle on the basis of the detection result of the preceding vehicle detecting means;

host vehicle speed detecting means for detecting a vehicle speed of the host vehicle;

host vehicle speed controlling means for controlling the vehicle speed of the host vehicle on the basis of detection results of the preceding vehicle detecting means and the host vehicle speed detecting means; and speed control canceling means for canceling the speed control of the host vehicle speed controlling means when: a) the preceding vehicle detecting means is incapable of detecting the preceding vehicle; and b) the inter-vehicle distance obtained at a moment just before the preceding vehicle detecting means is incapable of detecting the preceding vehicle is smaller than or equal to a predetermined value.

14. An adaptive cruise control system for a host vehicle, comprising:

a preceding vehicle detecting device configured to detect a preceding vehicle ahead of the host vehicle and to obtain an inter-vehicle distance between the host vehicle and the preceding vehicle on the basis of the detection result of the preceding vehicle detecting device;

a vehicle speed detecting device detecting a host vehicle speed of the host vehicle; and a controller coupled to the preceding vehicle detecting device and the vehicle speed detecting device, the controller being arranged to execute a vehicle speed control of the host vehicle on the basis of detection results of the preceding vehicle detecting device and the vehicle speed detecting device, and to cancel the vehicle speed control when: a) the preceding vehicle detecting device is incapable of detecting the preceding vehicle; and b) the inter-vehicle distance obtained at a moment just before the preceding vehicle detecting device becomes incapable of detecting the preceding vehicle is smaller than or equal to a predetermined value; and c) the controller is not controlling a braking force of the host vehicle to execute the vehicle speed control.

* * * * *